United States Patent [19]
Moriguchi et al.

[11] Patent Number: 4,607,262
[45] **Date of Patent: * Aug. 19, 1986**

[54] THERMAL HEAD DRIVE CIRCUIT

[75] Inventors: Haruhiko Moriguchi; Toshiharu Inui; Masami Kurata, all of Kanagawa, Japan

[73] Assignee: Fuji Xerox Co., Ltd., Tokyo, Japan

[ * ] Notice: The portion of the term of this patent subsequent to Jun. 18, 2002 has been disclaimed.

[21] Appl. No.: 569,705

[22] Filed: Jan. 10, 1984

[30] Foreign Application Priority Data

Jan. 11, 1983 [JP] Japan .................................... 58-1656

[51] Int. Cl.[4] ......................... G01D 15/10; H05B 3/00
[52] U.S. Cl. ................................ 346/76 PH; 219/216
[58] Field of Search .................... 346/76 PH; 219/216

[56] References Cited

U.S. PATENT DOCUMENTS 4,415,908 11/1983 Sugiura .......................... 346/76 PH
4,423,424 12/1983 Takayama ....................... 346/76 PH
4,524,368 6/1985 Inui et al. ....................... 346/76 PH

*Primary Examiner*—George H. Miller, Jr.
*Attorney, Agent, or Firm*—Sughrue, Mion, Zinn, Macpeak & Seas

[57] ABSTRACT

A thermal head drive circuit for use with a thermal head comprising multiple heat generating elements for data recording comprising a heat accumulation calculating unit (36) for calculating the heat residual from prior recording steps and a pulse width calculating unit (38) for calculating the pulse widths of voltage to be applied to an element dependent on the calculated residual heat and the pulse width of the prior recording step.

4 Claims, 11 Drawing Figures

THERMAL HEAD DRIVE CIRCUIT

BACKGROUND OF THE INVENTION

1. Field of the Invention

This invention relates to a thermal head drive circuit in a recording device such as a facsimile recorder or a printer which uses a thermal head.

2. Description of the Prior Art

A recording device which uses either a heat-sensitive recording sheet or a transfer type heat-sensitive recording medium to thermally record data is extensively employed for facsimile recording or the like. In general, a recording device of this type uses a thermal head as its recording head, which has a linear array of heat generating units or elements. The thermal head provides thermal energy for printing. Therefore, the thermal head suffers from a difficulty arising from the required heat thus provided with the result that the generated print is degraded in quality.

Especially, the print is adversely affected by heat accumulated during high speed recording. The heat which is electrically produced in the heat generating elements is utilized for printing and is thereafter radiated away through the base plate of the thermal head. However, when the thermal head is driven at high speed, for instance when a printing cycle is 10 millisecond or less, then the printing operation starts before the heat from the preceding operation is sufficiently dissipated through radiation, and accordingly heat is accumulated in the heat generating elements. As a result, the heat generating elements are not uniform in temperature during recording, and the printed dots are different in size and not uniform in density.

A recording device which records data with a transfer type-heat sensitive recording medium 11 piled on a recording sheet (ordinary sheet) 12 as shown in FIG. 1 suffers from the difficulty that heat generated by a thermal head 13 spreads out in the medium 11, thus thermally affecting the recording of the next line or the recording of the adjacent picture elements on the same line.

A recording device which performs a printing operation by causing one elongated heat generating structure to generate heat in only one part of the structure suffers from the drawback that heat is accumulated in the recording of the first half of one line, thus adversely affecting the recording of the second half. This will be described with reference to FIG. 2. Two groups of lead wires 15 and 16 are alternately connected at their first ends to an elongated heat generating structure 14 forming the thermal head of the recording device in such a manner that the lead wires are arranged at equal intervals. The lead wires 15 have the other ends connected to the respective parallel signal output terminals of a shift register driver 17. The lead wires 16 have their other ends alternately connected through diodes 18 to first and second common electrodes C1 and C2. Printing data 19, which are half of the data required for recording one line, are supplied to the shift register driver 17. The data are obtained by extracting bits at intervals of two bits from the complete data. After the data have been set in the shift register driver 17, a voltage is applied to the first common electrode C1. As a result, portions of the heat generating structure 14 which are between the lead wires 15 and the lead wires 16 connected to the first common electrode C1 are driven. These portions will hereafter be referred to as "heat generating elements". Recording is performed by the heat generating elements which are electrically energized to generate heat. After the first half of one line has been recorded, data required for recording the second half are set in the shift register driver 17. These data are the remaining half of the complete data. After the data have been set in the shift register driver 17, a voltage is applied to the second common electrode C2 to drive the remaining heat generating elements of the heat generating structure 14. Similarly in the second step, recording is performed by the heat generating elements which are electrically energized to generate heat. The second half of one line is recorded a very short time after the first half has been recorded. The heat which is generated in the recording of the first half of the line adversely affects the recording of the second half, as a result of which the quality of picture is lowered.

With the heat generating structure 14 as described above, a further problem arises in that a leakage current may pass through some of the heat generating elements depending on the signal which is applied to the shift register driver 17. For instance in the case where, under the condition that the voltage is applied to the first common electrode C1 and the leftmost lead wire 15 in FIG. 2 is not grounded but the next lead wire 15 is grounded, then a leakage current 21 flows to the lead wire 15 thus grounded as indicated by the dotted line in FIG. 2. Accordingly, each of three heat generating elements through which the leakage current flows generates heat the amount of which is one-ninth (1/9) of the amount of heat which is generated during printing. This leakage current heat also adversely affects the quality of print.

In order to overcome the drawback that the quality of print is lowered by the adverse effect of thermal energy, attempts have been made to adjust the voltage applied to the thermal head or the width of a pulse applied thereto, to thereby set the amount of thermal energy to a suitable value for each line. One example of such a thermal head drive circuit is as shown in FIG. 3. In the circuit, a counter 25 counts the black (printing) bits for every line which are included in the printing data 24 which is supplied to a thermal head 23. The counter 25 supplies a control signal 26 to a thermal energy control circuit 27 in correspondence to the count value. The thermal energy control circuit 27 is for instance a pulse voltage setting circuit or a pulse width setting circuit, which, when the thermal head 23 records a line next to the line which the counter 25 has counted, adjusts pulses 28 applied to the heat generating elements.

However, such uniform control for the entire thermal head cannot eliminate the above-described difficulties satisfactorily. Sometimes the control locally increases or decreases the temperature of the heat generating elements, thus lowering the quality of print. In the case of a recording device in which heat diffuses in the direction of the line (main scanning direction), similarly to the spreading shown in FIG. 1, even if heat accumulation is corrected for every line, its effect is not sufficient to overcome the diffusion.

SUMMARY OF THE INVENTION

Accordingly, an object of this invention is to provide a thermal head drive circuit for a recording device adapted to thermally record data, in which the amounts of thermal energy applied to the heat generating elements can be individually adjusted.

A thermal head drive circuit according to the invention comprises: a heat accumulation arithmetic unit for calculating the heat accumulated on the heat generating elements of a thermal head resulting from printing; and a thermal energy arithmetic unit for calculating the amounts of thermal energy to be applied to the heat generating elements from the voltage pulse widths applied during the preceding recording operation and from the above-described heat accumulations. In a recording device in which alternate elements of the thermal head are driven, one or both of the arithmetic units are provided for every group of heat generating elements which are simultaneously driven.

DETAILED DESCRIPTION OF THE INVENTION

This invention will be described in detail with reference to its embodiments.

Figure 4:
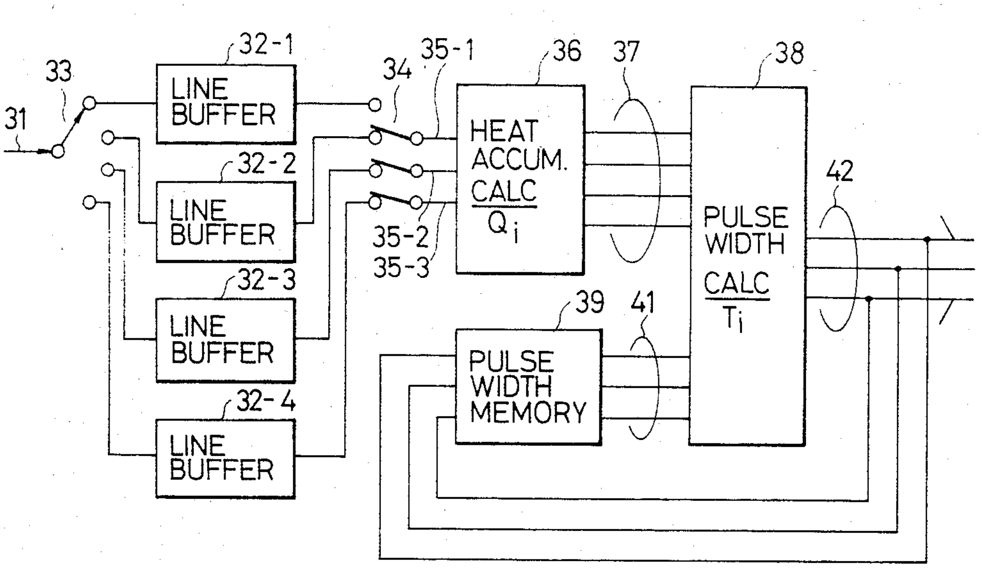
FIG. 4 is a block diagram outlining the arrangement of the thermal head drive circuit in a first embodiment of the invention.

FIG. 4 shows a thermal head drive circuit according to a first embodiment of the invention. The circuit comprises four line buffers 32-1 through 32-4 which write printing data 31 line by line. A selector 33 is supplied with a line synchronizing signal (not shown) so that its armature is tripped whenever printing data 31 for one line is applied thereto. When the selector 33 selects the first line buffer 32-1, printing data for a line which is to be recorded is written from the fourth line buffer 32-4. At the same time, printing data of one-line before is written from the third line buffer 32-3, and printing data of two-lines before is written from the second line buffer 32-2. A selector 34 is provided on the output side of these line buffers 32-1 through 32-4, to select the three line buffers other than one into which data are presently being written. In FIG. 4, the printing data are being written into the first line buffer 32-1, and the outputs of the other line buffers 32-2 through 32-4 are selected by the selector 34.

The printing data 35-1, 35-2 and 35-3 selected by the selector 34 are applied to an $Q_i$ arithmetic unit 36 which calculates a heat accumulation. The output 37 of the $Q_i$ arithmetic unit 36 is applied to a $T_i$ arithmetic unit 38. The $Q_i$ arithmetic unit is to calculate the amount of thermal energy applied to the heat generating elements of the thermal head (not shown), and to determine the widths of voltage pulses applied to the heat generating elements according to the amounts of thermal energy thus calculated. The $Q_i$ arithmetic unit 38 uses the arithmetic output 37 and the output signal 41 of a pulse width memory 39 which has stored the pulse widths of one-line before, to determine the pulse widths for a line which is going to be recorded. A pulse width signal 42 carried on a three line bus is provided for each heat generating element and is supplied to a pulse voltage applying circuit of the thermal head (to be described later).

Figure 5:
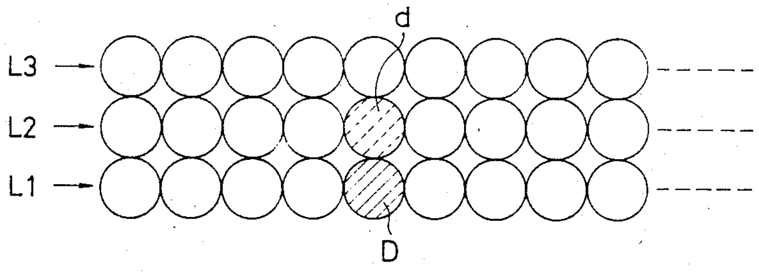
FIG. 5 is an explanatory diagram showing data trains for three lines.

In the thermal head drive circuit, the $Q_i$ arithmetic unit 36 and the $T_i$ arithmetic unit 38 are used to determine voltage pulse widths applied to the heat generating elements. This principle will be described with reference to FIG. 5. In FIG. 5, the lowermost data line $L_1$ represents the data for a line which is going to be recorded, the middle data line $L_2$ represents the data which occurs one-line earlier, and the uppermost data line $L_3$ represents the data which occurs two-lines earlier. Let us consider a datum D, here shaded, on the data line $L_1$. It is assumed that the most suitable pulse width applied to a heat generating element for the datum D is represented by the width $T_i$, and a heat accumulation at that position is represented by $Q_i$.

On the data line $L_2$, a datum d having the same heat generating element as the datum D and having a pulse width $t_i$ is applied to the heat generating element according to the value of the datum d. It is assumed that, in the thermal head drive circuit, the pulse width is determined for each heat generating element independently of printing; that is, whether or not printing is effected is determined according to whether or not voltage pulses are applied to the heat generating elements. In this case, the most suitable energy applied to the heat generating element for the data D can be represented by the following expression:

$$T_i = f(Q_i, t_i)$$

Figure 6:
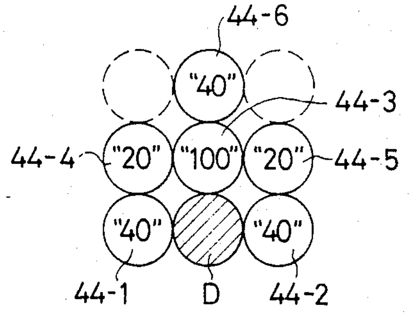
FIG. 6 is an explanatory diagram showing various data for a description of a heat accumulation calculating unit for the invention.

FIG. 6 shows the principle of calculating the heat accumulation $Q_i$ in the expression. In this embodiment, the heat accumulation $Q_i$ is calculated by using six data 44-1 through 44-6 (indicated by solid lines) around the data D. The heat accumulation $Q_i$ can be obtained by a method in which black data (i.e. data which has been actually printed) of the data 44-1 through 44-6 are added after being suitably weighted. If the datum 44-3 which is datum d and highest in thermal effect is weighted by "100", then the data 44-1 and 44-2 in the line $L_1$ may be weighted by "40", the data 44-4 and 44-5 in the line $L_2$ by "20", and the datum 44-6 in the line $L_3$ by "40". In the following table, excerpting a larger table which incorporates the weights, the heat accumulations $Q_i$ obtained as described above are quantized in seventeen steps 0 to 16. In the table, $Q_i=0$ means that the heat accumulation is smallest, and $Q_i=16$ means that the heat accumulation is largest.

TABLE 1

| DATA | | | |
|---|---|---|---|
| 44-1 | 000100 . . . 0 | 1 | 1 . . . 1 |
| 44-2 | 000010 . . . 1 | 0 | 1 . . . 1 |
| 44-3 | 000000 . . . 1 | 1 | 1 . . . 1 |
| 44-4 | 010001 . . . 0 | 1 | 0 . . . 1 |
| 44-5 | 001001 . . . 1 | 0 | 0 . . . 1 |
| 44-6 | 000000 . . . 0 | 0 | 0 . . . 1 |
| $Q_i$ | 011222 . . . 10 | 10 | 10 . . . 16 |

In FIG. 4, the $Q_i$ arithmetic unit 36 receives printing data 35-1, 35-2 and 35-3 for three lines and extracts six data 44-1 through 44-6. The $Q_i$ arithmetic unit 36 calculates $Q_i$ according to the above-described Table 1 with these data as address data.

Figure 7:
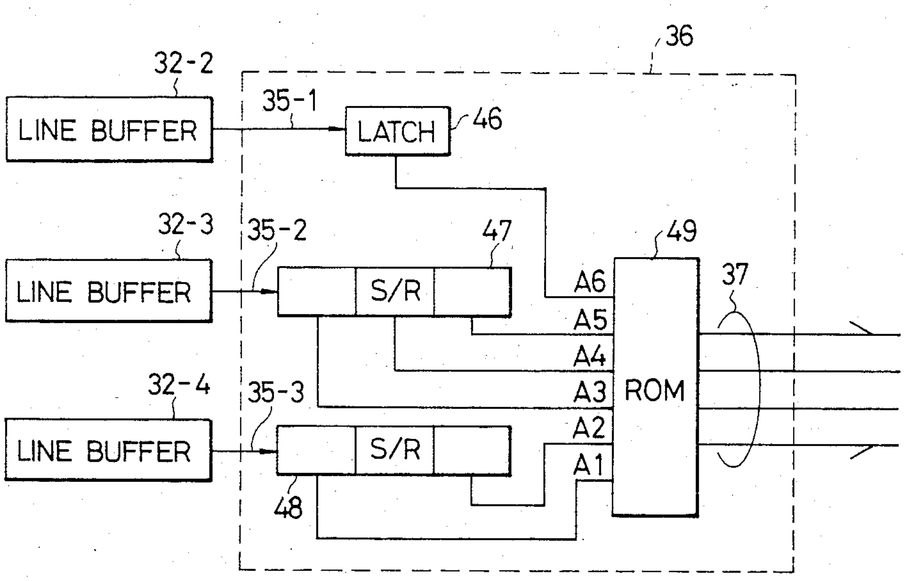
FIG. 7 is a block diagram showing the essential components of a $Q_i$ arithmetic unit for calculating heat accumulation.

FIG. 7 is a circuit diagram for a description of the operation of the $Q_i$ arithmetic unit which calculates the heat accumulation for the datum D by using Table 1. It should be noted that FIG. 7 is for the step in which the selector 33 is connected to the first line buffer 32-1 as shown in FIG. 4. In this step, the three line buffers 32-2, 32-3 and 32-4, being applied with a clock signal (not shown), start writing printing data for one line bit-by-bit in synchronization with one another. The printing data 35-1 (two-lines before) which is read out of the second line buffer 32-2 is applied to the $Q_i$ arithmetic unit 36, where it is delayed by one bit by a delay element (not shown) and is then applied to a 1-bit data latch circuit 46. The printing data 35-2 (for the line which is located one line before the line which is going to be recorded) which is read out of the third line buffer 32-3 is inputted into a 3-bit shift register 47. Similarly, the printing data 35-3 (for the line which is going to be recorded, or the present line) which is read out of the fourth line buffer 32-4 is inputted into a 3-bit shift register 48. The data latched by the 1-bit latch circuit 46 is supplied to an address terminal A6 of a ROM (read-only memory) 49 bit-by-bit. The 3-bit shift register 47 carries out serial-parallel conversion with varying delay, to supply the data to address terminals A5, A4 and A3 of the ROM 49. The 3-bit shift register 48 supplies the oldest data and the newest data respectively to terminals A2 and A1 of the ROM 49.

The table as indicated in Table 1 has been stored in the ROM 49. The address terminals A1 through A6 correspond to the data 44-1 through 44-6 in the table, respectively. The data $Q_i$ obtained from the table is applied, as the arithmetic data 37, to the $T_i$ arithmetic unit 38.

The $T_i$ arithmetic unit 38 shown in FIG. 4 detects the pulse widths applied to the heat generating elements for the preceding line with the aid of the output signal 41 of the pulse width memory 39, and determines the pulse widths for the line which is going to be recorded (hereinafter referred to as "the present line") from the heat accumulations $Q_i$ which are determined for the respective heat generating elements.

Figure 8:
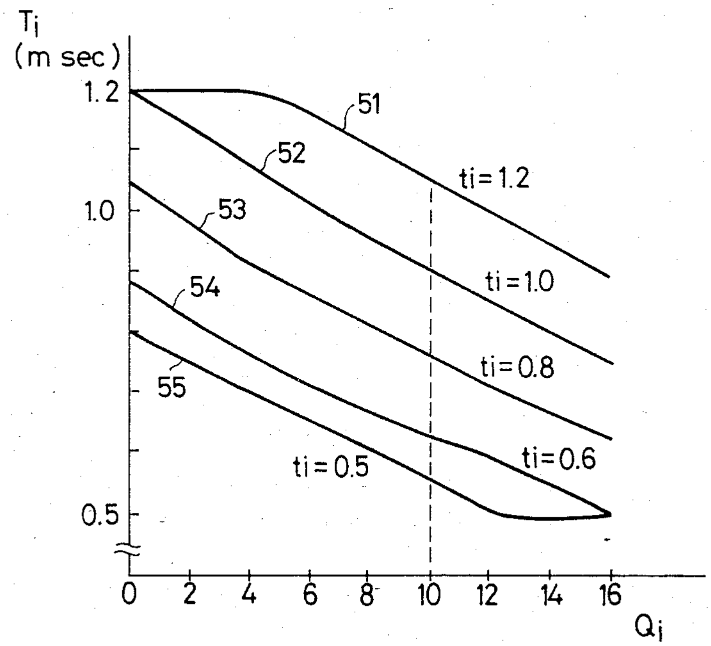
FIG. 8 is a graphical representation indicating input-output characteristics for a $T_i$ arithmetic unit for calculating pulse widths.

FIG. 8 shows inputs and outputs of the $T_i$ arithmetic unit. In FIG. 8, the horizontal axis expresses the inputs $Q_i$, and the vertical axis the outputs $T_i$ (m sec). Five curves 51 through 55 represent the input-output characteristics for pulse widths $t_i$ of the preceding line as indicated in FIG. 8. For instance, it is assumed that for some data, $Q_i$ is 10. Then, if the pulse width of a voltage applied to a heat generating element for the preceding line is 1.2 m sec, then it is reduced to 1.05 m sec for the present line; if the pulse width for the preceding line is 1.0 m sec, then it is reduced to 0.9 m sec for the present line; and if the pulse width for the preceding line is 0.5 m sec, then it is increased to 0.55 m sec. Such a pulse width signal 42, which is provided in correspondence to the bits of the printing data, is applied to the thermal head, so that the heat generating elements are thermally controlled with the respective pulse widths.

Figure 9:
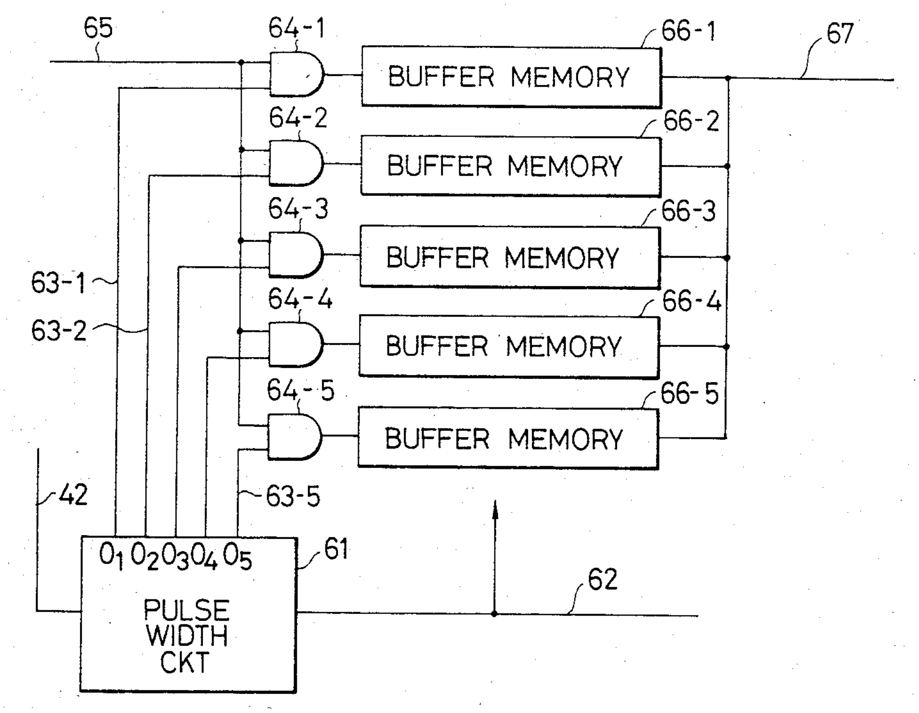
FIG. 9 is a block diagram of a circuit applying voltage pulses.

FIG. 9 shows a pulse voltage applying circuit for performing the above-described heat generation control. In the circuit, a pulse width determinning circuit 61 receives a pulse width signal 42 for one picture element at a time in synchronization with a clock signal 62, and provides gate control signals 63-1 through 63-5 at its output terminals $O_1$ through $O_5$ according to the pulse widths. The pulse width determining circuit 61 adjusts the amounts of heat generated by the heat generating elements in five steps of printing pulse widths arranged from 0.5 m sec to 1.2 m sec (0.5, 0.6, 0.8, 1.0 and 1.2 m sec). With a pulse width of 0.5 m sec, only a first gate control signal 63-1 is raised to an "H" (high) level. With a pulse width of 0.6 m sec, the first gate control signal 63-1 and a second gate control signal 63-2 are raised to the "H" level. With a pulse width 0.8 m sec, the first and second gate control signals 63-1 and 63-2 and a third gate control signal 63-3 are raised to the "H" level. With a pulse width 1.0 m sec, the first, second and third gate control signals 63-1, 63-2 and 63-3 and a fourth gate control signal 63-4 are raised to the "H" level. With a pulse width 1.2 m sec, the first through fourth gate control signals 63-1 through 63-4 and a fifth gate control signal 63-5 are raised to the "H" level.

These gate control signals 63-1 through 63-5 are applied to 2-input AND gates 64-1 through 64-5, respectively. Printing data 65, which is delayed by a delay circuit (not shown) to correspond with the pulse width signal 42 and the heat generating elements, are applied to these AND gates 64-1 through 64-5. Accordingly, if, when a signal "1" is provided as the printing data 65, the printing pulse width is 0.8 m sec, then the first through third AND gates 64-1 through 64-3 output signals "1", while the remaining AND gates 64-4 and 64-5 output signals "0". These output signals are applied to five buffer memories 66-1 through 66-5, respectively, which are provided respectively for the AND gates 64-1 through 64-5. When the printing data 65 for one line have been supplied to the AND gates 64-1 through 64-5, the printing data for one line are stored, as pulse width data, in the buffer memories 66-1 through 64-5.

Figure 10:
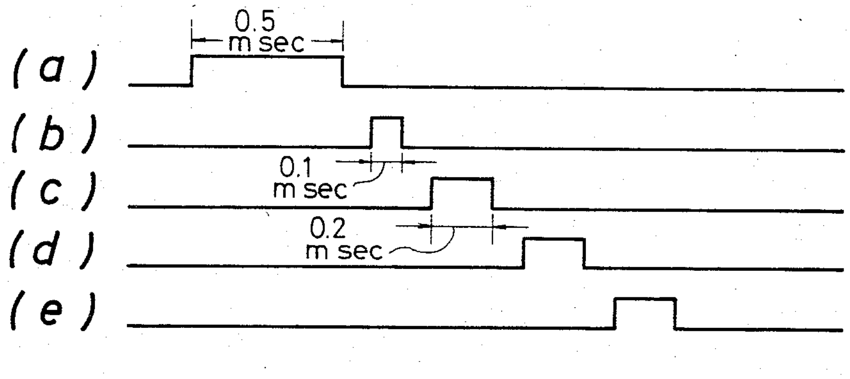
FIG. 10 is a timing chart indicating the application of voltage pulses.

The data thus stored are supplied, as pulse with control data 67, to a drive section of the thermal head. In the drive section, the content of the first buffer memory 66-1 is set in the shift register (not shown) of the thermal head, so that printing is performed by applying a pulse voltage having a pulse width 0.5 m sec as shown in FIG. 10(*a*). Next, the content of the second buffer memory 66-2 is set in the shift register, so that printing is carried out by applying a pulse voltage having a pulse width 0.1 m sec as shown in FIG. 10(*b*). Similarly, the contents of the third through fifth buffer memories 66-3 through 66-5 are successively set in the shift register, so that printing is performed by applying a pulse voltage having a pulse width 0.2 m sec, as shown in FIG. 10(*c*), (*d*) and (*e*). As a result, a heat generating element which prints data for instance with a pulse width of 0.8 m sec is electrically energized three times to a desired temperature as described with reference to the parts (a) through (c) of FIG. 10.

Figure 11:
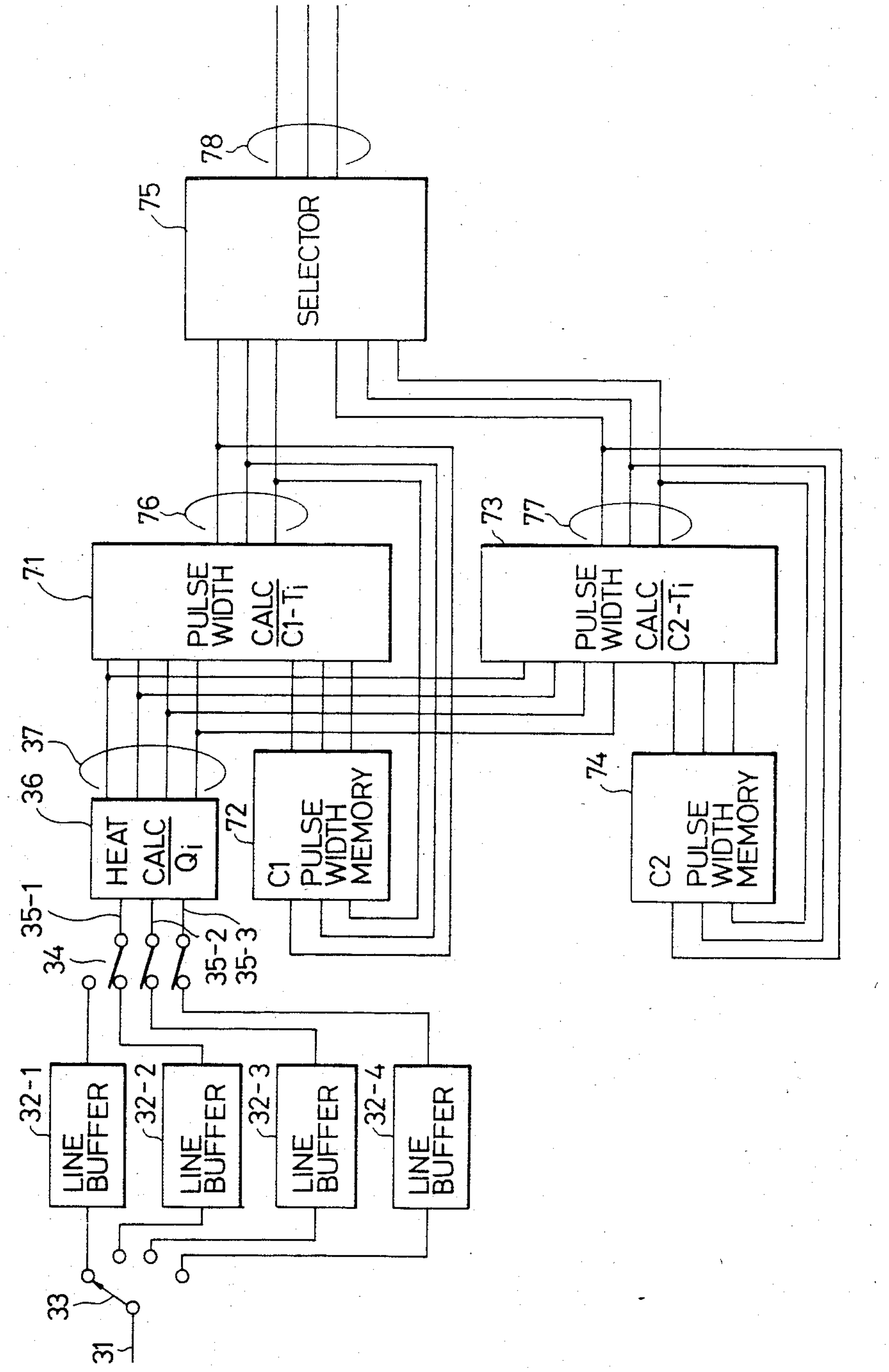
FIG. 11 is a block diagram outlining the arrangement if a thermal head drive circuit according a second embodiment of the invention.

In FIG. 11 is shown a thermal head drive circuit according to a second embodiment of the invention.

The circuit is provided for a thermal head using one elongated heat generating structure. In FIG. 11, those parts which have been described with reference to FIG. 4 are designated by the same reference numerals or characters and their detailed descriptions are omitted.

Figure 1:
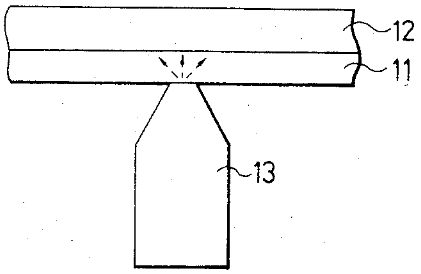
FIG. 1 is a side view of a transfer type heat-sensitive recording device, showing its recording principle.
Figure 2:
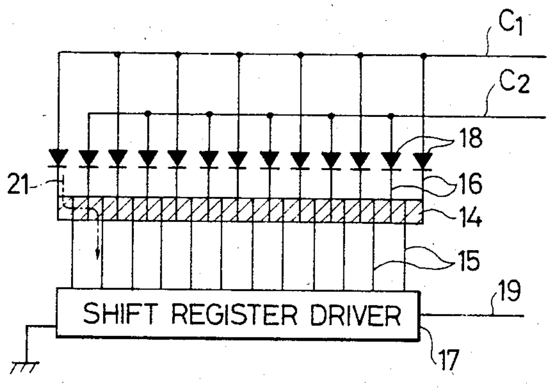
FIG. 2 is a circuit diagram outlining a recording circuit in a recording device which uses one elongated heat generating structure.
Figure 3:
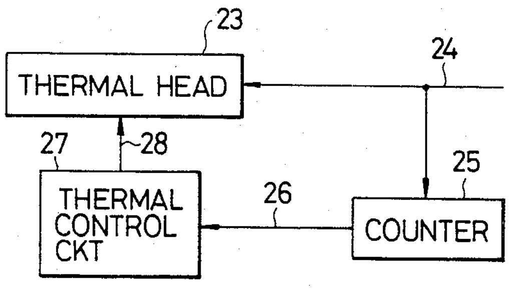
FIG. 3 PRIOR ART
FIG. 3 is a block diagram outlining a conventional thermal head drive circuit.

In the thermal head using one heat generating structure, voltages are alternately applied to the first and second common electrodes C1 and C2 as described with reference to FIG. 2, so that one line is printed in two steps. For this purpose, in the thermal head drive circuit, a C1-$T_i$ arithmetic unit 71 and a C1 pulse width memory 72 are provided for the first common electrode C1, and a C2-$T_i$ arithmetic unit 73 and a C2 pulse width memory 74 are provided for the second common electrode C2. A pulse width signal selector 75 alternately selects a pulse width signal 76 outputted by the C1-$T_i$ arithmetic unit 71 and a pulse width signal 77 outputted by the C2-$T_i$ arithmetic unit 73, and supplies it, as a pulse width selection signal 78, to the thermal head (not shown).

In the thermal head drive circuit, the arithmetic output 37 of the $Q_i$ arithmetic unit 36 is applied to the arithmetic units 71 and 73. The C1-$T_i$ arithmetic unit 71 determines the pulse width signal 76 according to the input-output characteristics as shown in FIG. 8. On the other hand, the C2-$T_i$ arithmetic unit 73 outputs the pulse width signal 77 whose pulse width is several tens of percent of that of the pulse width signal 76. Therefore, the C2-$T_i$ arithmetic unit 73 is provided with an operating circuit which meets such an input-output characteristic. The average value in pulse width of the pulse width signal 77 is made smaller than that of the pulse width signal 76 because of the accumulation of heat which is generated when the first half of one line is recorded. The pulse width signal selector 75 supplies the pulse width signal 76, as the pulse width selection signal 78, to the thermal head before the heat generating structure of the thermal head is electrically energized through the first common electrode C1. The thermal head records the first half of the line with the most suitable pulse width determined for each heat generating element as described in the first embodiment. Next, the pulse width signal selector 75 selects the other pulse width signal 76 as the pulse width selection signal 78, which is supplied to the thermal head. Similarly, the thermal head records the second half of the line with the most suitable pulse width determined for each heat generating element. The above-described operation is repetitively carried out to record the remaining lines.

In the above-described two embodiments, the pulse width of the applied voltage is changed for every heat generating element, in order to adjust the amount of heat generated; however, the same effect can be obtained by changing the applied voltage itself.

As is apparent from the above description, in the thermal head drive circuit of the invention, the amount of heat generated is controlled for every heat generating element with the thermal characteristic of the thermal head taken into account. Therefore, gradations in intensity can be satisfactorily recorded.

We claim:

1. In a recording device in which a thermal head is driven to thermally record data, a thermal head drive circuit, comprising:

a heat accumulation arithmetic unit (36) for calculating heat accumulations in heat generating elements forming said thermal head for recording data, wherein said calculation is performed as a function of whether areas adjacent to an area on which data is to be recorded have data recorded thereon, each of said adjacent areas being represented by a respective weighted value representative of the proximity of said adjacent area to said area to be recorded; and a thermal energy arithmetic unit (38) for calculating amounts of thermal energy to be applied to said heat generating elements from the voltage pulse widths which were applied to said heat generating elements during the preceding data recording operation and from said heat accumulations which are calculated by said heat accumulation arithmetic unit, said amounts of thermal energy calculated by said thermal energy arithmetic unit being applied respectively to said heat generating elements of said thermal head.

2. In a recording device in which multiple heat generating elements of one thermal head are alternately driven to record data line by line, a thermal head drive circuit, comprising:

a heat accumulation arithmetic unit for calculating heat accumulations of said elements from recording data; and a thermal energy arithmetic unit for calculating amounts of thermal energy to be applied to said elements from the voltage pulse widths which were applied to said elements during the preceding data recording operation and from said heat accumulations which are calculated by said heat accumulation arithmetic unit, said heat accumulation arithmetic unit and/or said thermal energy arithmetic unit being provided for every group of said elements which are simultaneously driven.

3. A thermal head drive circuit, as recited in claim 1, wherein said heat accumulation arithmetic unit calculates said heat accumulation for an element based on data to be concurrently recorded on neighboring elements and on data previously recorded by said element and said neighboring elements.

4. A thermal head drive circuit, as recited in claim 2, wherein said heat accumulation arithmetic unit calculates said heat accumulation for an element based on data to be concurrently recorded on neighboring elements and on data previously recorded by said element and said neighboring elements.

* * * * *